L. A. WIENKE.
TRACE FASTENER.
APPLICATION FILED APR. 18, 1917.
1,256,627.
Patented Feb. 19, 1918.
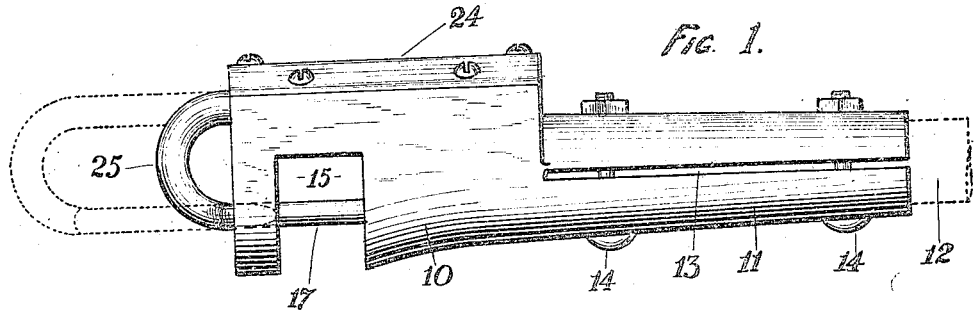
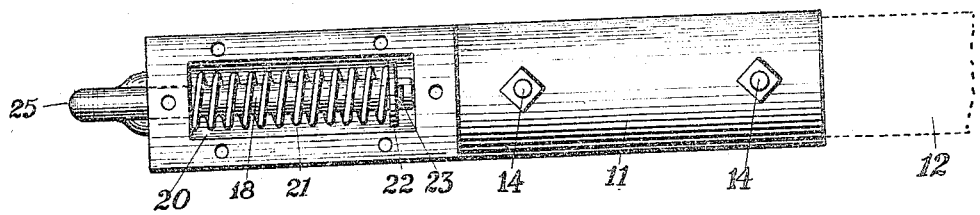
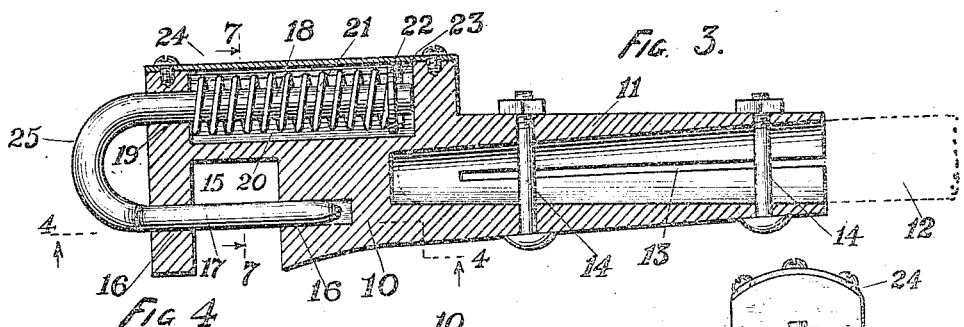
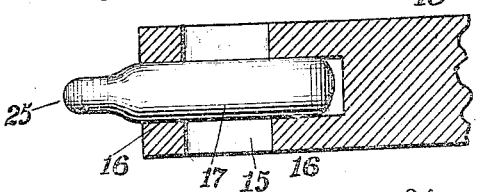
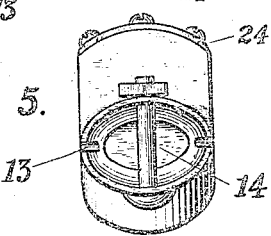
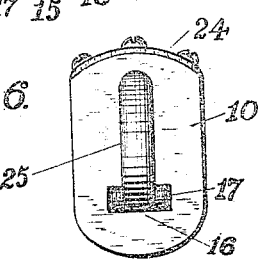
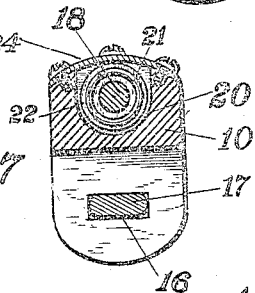
WITNESSES
INVENTOR
Louis A. Wienke.
By R. S. Caldwell
ATTORNEY.

UNITED STATES PATENT OFFICE.

LOUIS A. WIENKE, OF MANITOWOC COUNTY, WISCONSIN.

TRACE-FASTENER.

1,256,627.
Specification of Letters Patent.
Patented Feb. 19, 1918.

Application filed April 18, 1917. Serial No. 163,080.

*To all whom it may concern:*

Be it known that I, LOUIS A. WIENKE, a citizen of the United States, and resident of Manitowoc county, in the State of Wisconsin, have invented new and useful Improvements in Trace-Fasteners, of which the following is a description, reference being had to the accompanying drawings, which are a part of this specification.

My invention relates to new and useful improvements in trace fasteners, more particularly of a type adapted for use under rough and severe conditions, wherein a great strain and liability to displacement of the trace would be encountered.

It is primarily the object of my invention to provide a trace fastener which will positively hold a trace against all possibility of accidental displacement and which is of exceedingly simple and durable construction whereby it may efficiently meet the severe conditions encountered in heavy and rough work, and it is more particularly an object in this connection to so arrange the various parts as to minimize the possibility of breakage due to accidental blows thereagainst.

It is further an object to provide a fastener of this nature which permits of very ready manipulation in securing or releasing the trace.

With the above and other objects and advantages in view the invention resides more particularly in the novel combination, formation and arrangement of parts more fully hereinafter described and pointed out in the accompanying claim.

In the drawings:

Figure 1 is an elevational view of a harness trace fastener embodying my invention;

Fig. 2 is a plan view thereof, the cover plate of the bolt channel being removed;

Fig. 3 is a vertical longitudinal sectional view taken centrally through the trace fastener;

Fig. 4 is a horizontal sectional view therethrough on the line 4—4 of Fig. 3;

Fig. 5 is an inner end elevation of the fastener;

Fig. 6 is an outer end elevation; and,

Fig. 7 is a transverse sectional view through the fastener on the line 7—7 of Fig. 3.

Referring now more particularly to the accompanying drawings the present embodiment of my invention comprises a body member 10 formed of a single casting and provided at one end with an integral sleeve projection 11 adapted to receive one end of a swingletree 12 and provided with longitudinal open end slits 13 imparting some resiliency to the consequently formed sections of the sleeve whereby said sleeve sections may be clamped against the swingletree by securing bolts 14 passed through the swingletree and said sections.

The body member is provided in its lower portion with a transverse trace receiving passage 15 open at its bottom, and is also provided in said lower portion with a longitudinal recess 16 intersecting the passage 15. For securing a trace in the passage, a U-shaped bolt is provided, having one leg 17, which is horizontally flattened, slidable in the recess 16 and having its other leg 18 slidable in a longitudinal bore 19 in the outer end of the body member and projected into a longitudinal channel 20 in the top of said body member. For normally urging the bolt to a position projecting across the trace receiving passage 15, a coil spring 21 is disposed on the upper leg 18 of the bolt and bears against the outer end of the channel 20 and against a washer 22 held on the bolt leg by a cotter pin 23. The channel is closed by a suitably fastened cover plate 24 to form a general closed recess in conjunction with the bore 19 and thus all of the parts are efficiently housed, with the exception of the bight 25 of the U-bolt, which projects from the outer end of the body member, and which is rounded to procure a glancing contact of any object which may accidentally strike thereagainst.

By the provision of a U-shaped bolt having both legs slidable in the body casting, an exceeding compactness and efficiency of structure is procured, since the upper leg 18 of the U-bolt, which serves to mount the completely housed spring also serves to provide an additional bearing for the trace engaging member to insure its retention in proper alinement with that portion of its receiving recess inwardly of the trace receiving passage. The spring and cotter pin on the bolt leg 18 provide a means for limiting outward movement of the U-bolt. The bight portion 25 of the U-bolt also forms a convenient finger piece whereby the device may be manipulated in a most ready manner for securing or releasing a trace.

By horizontally flattening the bolt leg 17, a maximum strength thereof is procured consistent with a proper width to engage in the usual elongated receiving eye of the trace, and this flattening of the bolt leg to correspond to the elongated shape of the trace eye also serves to prevent a sagging movement of the trace adjacent the receiving device.

It is further noted that by the disposition of the bolt leg recess 16 at both sides of the trace receiving passage, a double bearing is afforded for the bolt leg 17, and the housing afforded the bolt leg at both sides of the trace receiving passage positively prevents any possibility of displacement of the trace, due to swinging movements of the swingletree or to any other cause.

What I claim as new and desire to secure by Letters Patent is:

A trace fastener, comprising a split socket with clamping bolts forming a clamping ferrule for engaging the end of a swingletree, there being a recess in the bottom of the socket member and a recess in the top of the socket member, a sheet metal cover for the top recess, a coil spring contained in the top recess, a U-shaped bolt slidable longitudinally through openings in the socket member and entering both recesses with the spring engaged on one end thereof and the other end flattened horizontally and embedded in the socket member after crossing the lower recess, said flattened end of the U-shaped bolt being adapted to fit within the eye of a trace or the link of a tug chain and disengaged therefrom by pulling the bolt against the action of the spring.

In testimony whereof, I affix my signature, in presence of two witnesses.

LOUIS A. WIENKE.

Witnesses:
OTTO G. BERGE,
ALBERT WIENKE.

Copies of this patent may be obtained for five cents each, by addressing the "Commissioner of Patents, Washington, D. C."